March 20, 1956     T. R. TIMBIE     2,739,302
ICE DETECTOR
Filed Jan. 10, 1951
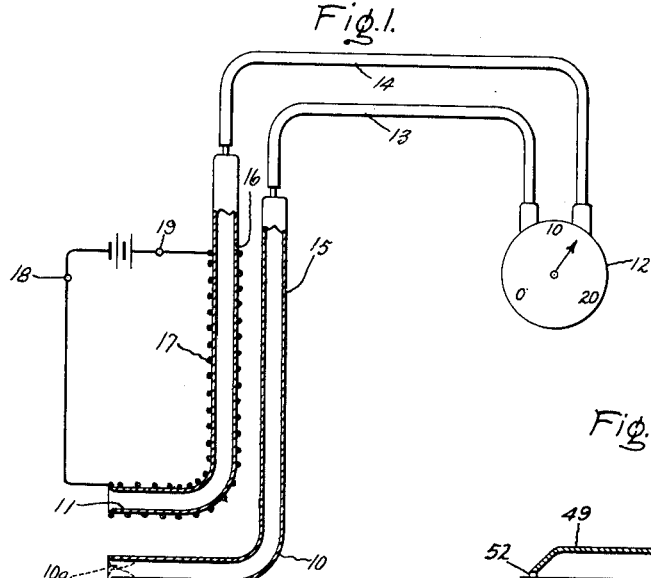
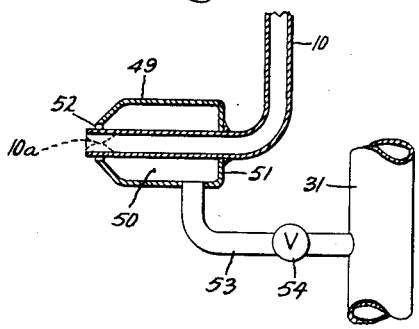
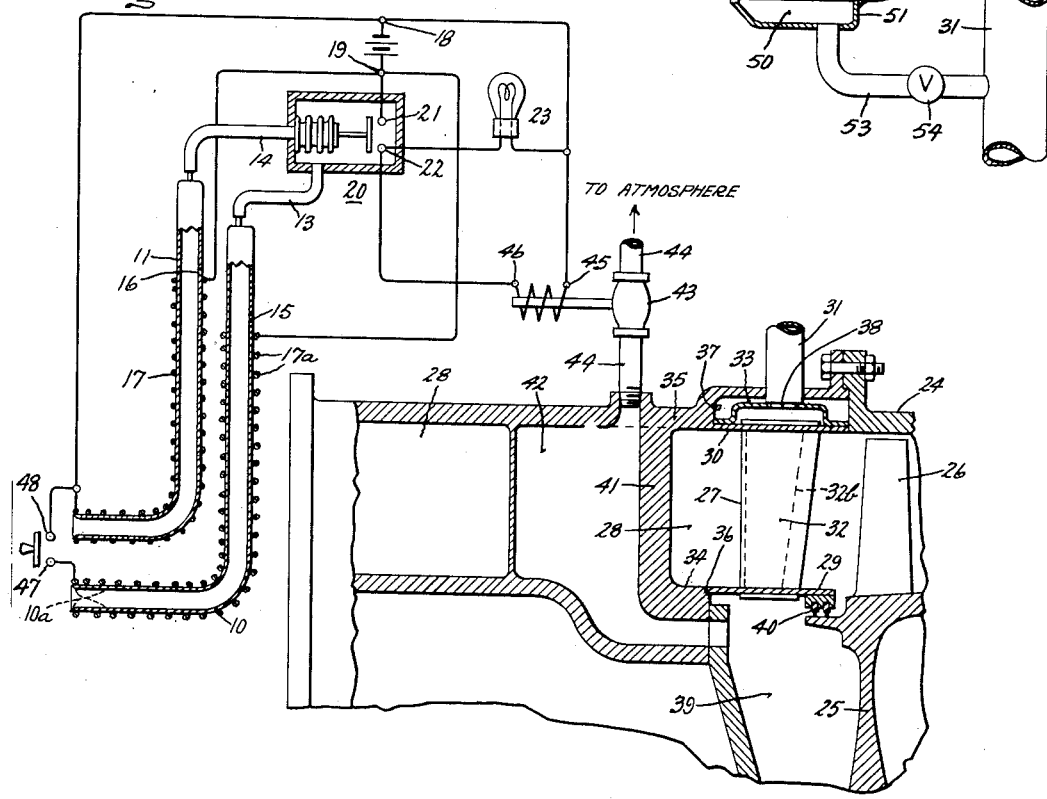
Inventor:
Theodore R. Timbie,
by Ernest C. Britton
His Attorney.

United States Patent Office 2,739,302
Patented Mar. 20, 1956

2,739,302

ICE DETECTOR

Theodore R. Timbie, Winchester, Mass., assignor to General Electric Company, a corporation of New York Application January 10, 1951, Serial No. 205,326

3 Claims. (Cl. 340—234)

This invention relates to apparatus for determining when atmospheric conditions are favorable for the formation of ice on moving or stationary objects such as wings and other external parts of an aircraft, and more particularly to apparatus for detecting the presence of ice formation in an inlet duct to an aircraft powerplant.

Aircraft powerplants must be capable of operation under widely varying atmospheric conditions, for example, at or near sea level in tropic regions where the temperature is relatively high and at extremely high altitudes where the ambient temperature is sufficiently low to freeze any moisture particles which may be contained in the air taken into the induction system of the powerplant. While the invention may be used in connection with any type of powerplant where ice formation at the inlet thereto is a troublesome problem, the invention is particularly suited for use in a powerplant of the type described in a copending application of Alan Howard, S. N. 541,565, filed June 22, 1944, now Patent No. 2,711,074, and assigned to the assignee of the present application. Such a powerplant comprises an air compressor, a gas turbine for driving the compressor, combustion apparatus utilizing compressed air supplied thereto by the compressor to provide heated motive fluid under pressure for driving the turbine, and a nozzle which utilizes hot gases discharged from the turbine to provide a propulsion jet. A powerplant of the type described operates generally as follows: Air enters the forward end or inlet of the compressor. This air is then compressed by the compressor and is delivered to the combustion apparatus where it is heated by the addition of fuel. The heated air serves as motive fluid for driving the turbine which in turn drives the compressor, and the fluid discharged from the turbine is then discharged through the propulsion nozzle as a jet for propulsion of an aircraft.

If the inlet to such a powerplant becomes restricted due to the accumulation of ice therein, the operation of the powerplant is adversely affected since the quantity of airflow to the powerplant is reduced. This reduction in air flow not only reduces the thrust or power output of the powerplant, but may, due to the fact that a reduced quantity of air is flowing through the combustion apparatus, cause the temperatures in the turbine and other portions of the powerplant to rise to such values as to render unsafe continued operation under such conditions, and may cause complete destruction of the powerplant.

Accordingly, it is an object of this invention to provide novel and improved means for detecting an incipient icing condition of the atmosphere and for giving an indication thereof.

A further object of the invention is to provide improved apparatus for detecting ice formation in the induction system of an aircraft powerplant and which will operate to warn the powerplant operator of the icing condition, or will automatically start the operation of de-icing apparatus, or both.

Other objects and advantages will become apparent from the following description taken in connection with the accompanying drawings, in which Fig. 1 is a diagrammatic view of a simplified arrangement of apparatus embodying the principles of my invention; Fig. 2 is a diagrammatic view, partly in section, showing a modified form of the invention installed in the induction system of an aircraft powerplant, and Fig. 3 is a partly sectionalized view of a modification of structure in the invention shown in Fig. 2.

Referring now to Fig. 1, my improved ice detecting apparatus comprises a pair of impact tubes 10, 11 connected to a differential pressure gage 12 by connecting tubing 13, 14, respectively. One skilled in the art will recognize that an impact tube is a well-known type of device for measuring the dynamic pressure of fluid flowing relative to the impact tube. For reasons which will become apparent as the description proceeds, impact tubes 10 and 11 are substantially identical with respect to internal shapes and dimensions. In order to cause a small flow through a portion of impact tubes 10, 11, discharge orifices 15, 16 respectively, are provided at a location remotely spaced from the open end of the respective impact tubes. The size, that is, the flow area of discharge openings 15, 16 is not critical, but for reasons that will appear presently, it may be desirable to make the flow area of discharge orifices 15, 16, relatively small as compared to the cross sectional area of impact tubes 10, 11.

It is a feature of the invention that the rate of flow through orifice 15 is caused to be the same as the rate of flow through orifice 16, and therefore the pressure within tube 10 is equal to the pressure within tube 11. Therefore, the internal shapes and dimensions of impact tubes 10, 11, the spacing of discharge orifices 15, 16 with respect to the open end portions of impact tubes 10, 11, and the flow area of orifices 15 and 16 are made substantially identical. It will be appreciated by those skilled in the art that such an arrangement makes the operation of my invention insensitive to changes in altitude or airspeed, or, in other words, my improved apparatus will function satisfactorily irrespective of changes in altitude or variations in operating speed of an aircraft in which the apparatus is installed.

Furthermore, in certain instances it may be desirable, although not absolutely essential, that discharge orifices 15, 16 be arranged to discharge fluid in substantially the same direction and parallel to the flow of fluid that enters the open end portions of impact tubes 10, 11.

While the size of discharge orifices 15, 16 is not critical, these orifices should be of relatively small cross sectional flow area as compared to the cross sectional area of impact tubes 10, 11, in order to provide a pressure drop between the pressure of the fluid contained within impact tubes 10, 11 and the static pressure of the ambient atmosphere in the region adjacent to discharge orifices 15, 16. As previously indicated, the impact tubes 10, 11 should be identical as to internal shapes and dimensions and in addition, while the flow area of discharge orifices 15, 16 is not critical, the area of the discharge orifices should be substantially identical so that substantially equal quantities of fluid will be discharged from orifices 15, 16 respectively, and so that the pressure of the fluid contained within impact tubes 10, 11 will be substantially equal. Thus it will be seen that with no ice formation existing at the entrance portion to impact tubes 10, 11, the amount of fluid flowing through the forward portions of the impact tubes and discharged from discharge orifices 15, 16 will be substantially identical and the pressure of the fluid contained within the impact tubes will be identical so that the differential pressure gage will indicate no pressure differential. As previously indicated, this gage will indicate no pressure differential regardless of the altitude or airspeed of an aircraft in which the device may be installed.

In addition to the previously indicated limitations with respect to the location of discharge orifices 15, 16, it is desirable to locate these orifices at any convenient location where there will be no tendency for the discharge orifices to become blocked.

It is also a feature of the invention that one of the impact tubes 10 is allowed to accumulate any ice formation which may tend to occur, while the other impact tube 11 is provided with means for preventing such formation at the entrance thereto. To this end, I provide means for heating the forward portion of impact tube 11, that is, the portion between the open end portion and the discharge orifice 16 to prevent the formation of ice within the tube during any condition of operation. As illustrated in the drawing, one such heating means may comprise a wire or heating element 17 surrounding and in contact with the wall of impact tube 11. The wire or heating element 17 is connected to battery terminals 18, 19. The battery supplies sufficient electrical energy to heating element 17 to prevent any moisture which may be contained in the ambient atmosphere from freezing on the exposed surfaces of impact tube 11.

If, during the operation of the device, atmospheric conditions become favorable to the formation of ice, ice particles will first begin to form at the entrance to impact tube 10 as indicated at 10a. As ice particles begin to accumulate in this region, a greater restriction is presented to the flow of atmospheric fluid through impact tube 10 and discharge orifice 15 than is the case with fluid which flows through impact tube 11 and discharge orifice 16 since impact tube 11 is protected against ice formation. Therefore, there will be a difference in the quantity of flow discharged from orifices 16 and 15 and, because of the restriction at 10a in the entrance portion of impact tube 10, the pressure of the fluid contained within impact tube 10 will no longer equal the pressure in unrestricted impact tube 11, and the differential pressure gage will now indicate some difference in pressure.

Such a difference in pressure serves as a warning to the operator of a power plant that an icing condition exists at the inlet of the powerplant before any ice formation can accumulate to a sufficient degree to cause damage to the powerplant.

Referring now to Fig. 2 a modified embodiment of the invention illustrated in Fig. 1 is shown installed at the inlet of a gas turbine powerplant provided with means for de-icing exposed portions of the powerplant on which ice accumulations are likely to occur. Like elements bear the same notation as the corresponding elements in Fig. 1. A pressure switch 20 replaces differential pressure gage 12. As illustrated in the drawings, pressure switch 20 is arranged to close electrical contacts 21, 22 when the pressures within tubes 10, 11 are unbalanced thereby energizing an electrically operated warning lamp, buzzer, or any other desired type of electrically energized warning device 23.

The compressor section of such a powerplant comprises a stator 24, a rotor having a plurality of wheel or disk members 25 to which are secured a plurality of moving blades 26, and an inlet passageway 28. A plurality of inlet guide vanes 27 are provided in the inlet passageway 28 to direct fluid at the proper angle to the first row of moving blades 26.

To support vanes 27, inner and outer shroud bands 29, 30 are provided. The inner and outer bands are punched to receive the outer ends of vanes 27 which project entirely through the inner and outer bands. Since ice tends to accumulate on the guide vanes under adverse weather conditions, heated fluid is supplied thereto by conduit 31 to prevent such accumulation. Vanes 27 are hollow, having a passageway 32 extending therethrough as indicated by the broken lines 32a, 32b. Vanes 27 are secured to bands 29, 30 by welding or in any other desired manner that will not obstruct the flow of fluid through passageway 32. The outer end portions of vanes 27 are connected in parallel flow relation by the provision of a U-shaped member 33 secured to band 30 to form a type of manifold communicating with the passageway 32 of each of the several vanes 27. Walls 34, 35 of the inlet passageway 28 are provided with recessed portions 36, 37, respectively, for locating and securing the vane and band assembly in spaced relation with respect to the first row of moving blades 26. Conduit 31 registers with an opening 38 in U-shaped member 33 to establish a continuous flow path from conduit 31 through passageways 32 in guide vanes 27.

At all times during the operation of the powerplant, a relatively small amount of heated fluid is supplied to vanes 27. This fluid flows through hollow passageways 32 and is discharged therefrom into a chamber 39. A seal 40 is secured to one end of band 29 to control the leakage from chamber 39 into the passageway 28 of the compressor. It will be obvious that control of this leakage also controls the amount of heated fluid flowing through hollow passageways 32. Under ordinary operating conditions, a relatively small flow of heated fluid will keep the vanes 27 sufficiently warm to prevent any appreciable ice formation thereon. When adverse or extremely unusual icing conditions are encountered, it may be desirable to increase the quantity of flow and the velocity of the heated fluid in passageway 32 to increase the rate of heat transfer through vanes 27. To this end, a strut member 41 having an internal passageway 42 therein is provided. Strut member 41 extends in a substantially radial direction between walls 34, 35 with the inner end of passageway 42 in communication with chamber 39 as indicated in the drawing. The outer end of passageway 42 is connected to a valve 43 by conduit 44.

Under most conditions of operation, valve 43 is intended to remain closed, but, when adverse weather conditions are encountered valve 43 is open to augment the rate heat transfer to vanes 27 in the manner previously described. Such a de-icing apparatus is described with greater particularity in a co-pending application of Neil Burgess, Serial No. 134,024, filed December 16, 1949, and assigned to the assignee of the present application.

Although not necessarily limited thereto, my invention is readily adaptable for use with such a de-icing system. For example, the embodiment of the invention shown in Fig. 1 may be employed to control the operation of valve 43. Valve 43 may be of any well-known type of electrically actuated valve, for example, a solenoid operated valve. In such case, the valve is arranged to be closed during periods when no electrical energy is applied to the solenoid, and open when the solenoid is energized.

Impact tubes 10, 11 are installed at the entrance to or in passageway 28 at any convenient location and at the upstream side of guide vanes 27. Terminals 45, 46 of solenoid valve 43 are then electrically connected to battery terminals 18, 19 with switch contacts 21, 22 in series with connection 46.

Operation of the ice detecting apparatus is as described in the preceding case. Upon the formation of ice particles at the entrance to impact tube 10, the pressures in impact tubes 10 and 11 will become unbalanced, thus causing switch contacts 21, 22 to become closed in the manner previously described. When contacts 21, 22 are in the closed position, solenoid valve 43 is electrically connected to battery terminals 18, 19 thus causing the valve to open and augment the quantity and the velocity of the heating fluid flowing through passages 32 to increase the heat transfer to vanes 27 in the manner previously described.

Fig. 2 also shows an additional improvement over the elementary arrangement illustrated in Fig. 1. It may be desirable to provide means for de-icing impact tube 10, which is not heated during the normal operation, after the apparatus has been subjected to atmospheric icing conditions so that impact tube 10 has become partially clogged with ice as indicated at 10a. A wire or heating element 17a, similar to 17, surrounds the wall of impact tube 10 adjacent the open end portion thereof. Electrical energy for heating element 17a is also obtained from battery terminals 18, 19. However, since no heating of impact tube 10 is desired during normal operation, heating element 17a is connected in series with normally open switch terminals 47, 48 to battery terminals 18, 19 instead of connecting elements 17a and 17 in parallel with battery terminals 18, 19.

During operation of the apparatus, an atmospheric icing condition is indicated by the existence of the pressure differential as previously described in connection with Fig. 1. As impact tube 10 becomes restricted to a greater degree due to the accumulation of more and more ice particles, the magnitude of the pressure differential will increase. After icing conditions have been encountered to the extent that unheated tube 10 had become completely or substantially clogged with ice or after any icing condition has been encountered, tube 10 can be de-iced by closing switch terminals 47, 48 until any ice particles which may have accumulated at the open end portion thereof have become melted so that the apparatus is thereby made ready to detect further icing conditions. When the pressure differential becomes reduced to zero or substantially thereto thus indicating that tube 10 is no longer clogged, the heat supplied to impact tube 10 can be discontinued by re-opening switch terminals 47, 48.

Fig. 3 illustrates another embodiment of a means for de-icing impact tube 10. In this embodiment of the invention, heating element 17a is replaced by an annular wall portion 49 adjacent the open end portion of impact tube 10. Wall portion 49 is concentric with and spaced from the outer wall of tube 10 to form an annular passageway 50. One end portion of passageway 50 is closed by the provision of a wall portion 51 which is secured to tube 10 in any convenient manner, for example, by welding. Heated fluid for de-icing tube 10 is supplied to passageway 50 in a manner to be described hereinafter.

In order to improve the rate of heat transfer from the heated fluid to the wall of tube 10, the left-hand end portion of wall portion 49 is necked down to form a restricted annular opening 52 surrounding the wall of impact tube 10.

In order to establish communication between passageway 50 and a source of supply of heater fluid, conduit 53 is provided to connect passageway 50 to conduit 31, and valve 54 is provided to control the flow of heated fluid therethrough.

In operation, the operator opens valve 54 allowing heated fluid to flow from conduit 31 through conduit 53 and passageway 50 whenever it is desired to remove any ice particles which may have accumulated at 10a. After tube 10 has been de-iced, as indicated by substantially zero pressure differential, the flow of heated fluid to passageway 50 is discontinued by closing valve 54 thereby making the apparatus again ready to detect further icing conditions.

Thus it will be seen that the invention provides a simple and effective warning device for detecting incipient icing conditions as well as an automatic means for starting the operating of de-icing apparatus in an aircraft powerplant in response to such operating conditions.

While particular embodiments of the invention have been illustrated and described, it will be obvious to those skilled in the art that various changes and modifications may be made without departing from the invention, and it is intended to cover in the appended claims all such changes and modifications that come within the true spirit and scope of the invention.

What I claim as new and desire to secure by Letters Patent of the United States is:

1. In an apparatus for detecting ice formation, a pair of substantially identical impact tubes each having an end portion for sensing the dynamic pressure of a fluid stream, said end portions each having an opening of substantially the same area, each of said tubes also having a discharge orifice communicating the interior thereof with the atmosphere, said orifices being substantially equally spaced from said end portions for sensing, indicating means responsive to differential pressures, means connecting said impact tubes to said indicating means, means for heating one of said impact tubes to prevent ice formation therein, said other tube collecting ice in its end portion when moving through a fluid stream in the presence of icing conditions, the presence of ice in the end portion of said other tube causing said other tube to sense a dynamic pressure which differs from the dynamic pressure sensed by said heated tube, the difference in dynamic pressures being sensed by said differential pressure means.

2. In an apparatus for detecting ice formation, first and second impact tubes each having an end portion for sensing the dynamic pressure of a fluid stream, switching means operable in response to differential pressures connected to said impact tubes having an opening in its end portion of substantially the same area and, each of said impact tubes being substantially identical in form and having a discharge orifice establishing communication between the interior thereof with the atmosphere and spaced from said end portion for sensing, terminals for transmission of electrical energy, means electrically connecting said switch means to said terminals, means for heating the first of said impact tubes to prevent ice accumulation therein, the second impact tube collecting ice in its end portion when moving through a fluid stream in the presence of icing conditions, the presence of ice in the end portion of said second tube causing the tubes to sense differing dynamic pressures, the difference in dynamic pressures operating to actuate the switching means.

3. In an apparatus for detecting ice formation, first and second impact tubes each having an end portion for sensing dynamic pressure of a fluid stream, each of said tubes having a discharge orifice spaced substantially equally from said end portion and establishing communication between the interior thereof and the atmosphere, said end portions each having an opening of substantially the same area, electrical indicating means, switching means including normally open electrical contacts connected to said impact tubes and operable in response to a differential pressure, terminals adapted to receive electrical voltage, means for heating one of said impact tubes to prevent ice accumulation therein, said other tube collecting ice in its end portion when moving through a fluid stream in the presence of icing conditions, the presence of ice in the end portion of said other tube causing said other tube to sense a dynamic pressure which differs from the dynamic pressure sensed by said heated tube, and means connecting said terminals, contacts, and indicating means electrically in series whereby said indicating means is operable only when a differential pressure exists between said impact tubes.

References Cited in the file of this patent

UNITED STATES PATENTS

| 2,464,047 | Larkin | Mar. 8, 1949 |
| 2,541,512 | Hahn | Feb. 13, 1951 |
| 2,566,813 | Thorsen | Sept. 4, 1951 |

FOREIGN PATENTS

| 446,983 | Great Britain | May 11, 1936 |
| 626,543 | Great Britain | July 18, 1949 |